US 11,371,530 B2

(12) United States Patent
Chan et al.

(10) Patent No.: US 11,371,530 B2
(45) Date of Patent: Jun. 28, 2022

(54) FAN AND FAN IMPELLER THEREOF

(71) Applicant: Delta Electronics, Inc., Taoyuan (TW)

(72) Inventors: Chih-Wei Chan, Taoyuan (TW); Cheng-Hsien Yeh, Taoyuan (TW); Hui-Lun Chin, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 62 days.

(21) Appl. No.: 16/994,593

(22) Filed: Aug. 15, 2020

(65) Prior Publication Data
US 2021/0102550 A1 Apr. 8, 2021

Related U.S. Application Data

(60) Provisional application No. 62/912,204, filed on Oct. 8, 2019.

(51) Int. Cl.
F04D 29/38 (2006.01)

(52) U.S. Cl.
CPC ......... *F04D 29/384* (2013.01); *F04D 29/388* (2013.01)

(58) Field of Classification Search
CPC .. F04D 29/384; F04D 29/388; F04D 29/2238; F04D 29/2255; F04D 29/2261; F04D 29/2272; F04D 29/667; F04D 29/68; F04D 29/28; F04D 29/281; F04D 29/30
See application file for complete search history.

(56) References Cited

U.S. PATENT DOCUMENTS

| 6,877,954 B2* | 4/2005 | Lin | F04D 29/281 |
| | | | 257/E23.099 |
| 2021/0199121 A1* | 7/2021 | Wang | F04D 29/666 |
| 2021/0199123 A1* | 7/2021 | Wang | F04D 29/34 |

FOREIGN PATENT DOCUMENTS

| CN | 2414236 Y | 1/2001 | |
| CN | 105849413 A | 8/2016 | |
| CN | 205895691 U | 1/2017 | |
| CN | 206957958 U | 2/2018 | |
| CN | 110017293 A | 7/2019 | |
| KR | 1020040084411 | * 10/2004 | |
| TW | I498487 B | 9/2015 | |
| WO | WO-2015136833 A1 * | 9/2015 | ......... F04D 29/2238 |

OTHER PUBLICATIONS

Translation of WO2015136833 (Year: 2015).*
Translation of KR1020040084411 (Year: 2004).*
Office Action dated Mar. 22, 2022 of the corresponding China patent application No. 202010906525.7.

* cited by examiner

*Primary Examiner* — Eldon T Brockman
*Assistant Examiner* — Brian O Peters
(74) *Attorney, Agent, or Firm* — Chun-Ming Shih; HDLS IPR Services

(57) ABSTRACT

A fan includes a fan impeller. The fan impeller includes an inner frame, an outer frame and a disturbing structure. The inner frame rotates along a rotation axis. The outer frame is disposed around the inner frame. The blades are disposed between the inner frame and the outer frame and arranged radially. The disturbing structure has a plurality of protrusion columns disposed on the outer frame, and the protrusion columns are arranged surrounding the blades. The protrusion columns are provided to generate vortexes in the flow field for disturbing the flow as to reduce noise, and the wind (Continued)

pressure can be increased to obtain better operating characteristics.

12 Claims, 14 Drawing Sheets

FAN AND FAN IMPELLER THEREOF

CROSS-REFERENCE TO RELATED APPLICATION

This patent application claims the benefit of U.S. Provisional Patent Application No. 62/912,204, filed Oct. 8, 2019, which is incorporated by reference herein.

BACKGROUND OF THE INVENTION

Field of the Invention

The present invention generally relates to a fan impeller, and more particularly, to a fan impeller with a comb-shaped disturbing structure.

Description of Related Art

Generally, the operating characteristics of a fan can be improved by adjusting the pitch angle of blades in the blade design or adjusting the extension direction of airfoil, the quantity of blades, and surfaces of existing blades. However, the outputted noise becomes louder as these characteristics are enhanced. As the requirements of heat dissipation in various types of devices are increasing day by day, these devices require a lower noise threshold to operate so as to not become a disturbance. Attempting to achieve a better balance under the two contradictory design parameters is a big problem. Therefore, the standard for evaluating performance of current fan designs is to consider its properties of heat dissipation at a constant noise level. Under this premise, the design of fan blades is a key factor for designing a fan with a low noise in a limited flow channel space, while having better properties of heat dissipation at the same flow resistance.

In the design concept of traditional blades, fan blades have rapid changes of speed and pressure fields at the ends of the blades, and as a side effect, the noise it creates gets louder. The existing technology varies only in pitch angles or blade quantity. However, the fan's operating characteristics cannot be effectively improved while keeping to noise requirements, which makes it difficult to achieve the best design balance of fan speed, its' operating characteristics, and the resulting noise level.

SUMMARY OF THE INVENTION

Accordingly, an object of the present invention is to provide a fan and fan impeller thereof with comb-shaped disturbing structure.

In order to achieve the object mentioned above, the present invention provides a fan impeller including an inner frame, an outer annular frame, a plurality of blades and a disturbing structure. The inner frame rotates along a rotation axis. The outer annular frame is disposed around the inner frame. The blades are disposed between the inner frame and the outer annular frame and are arranged radially. The disturbing structure has a plurality of protrusion columns disposed on the outer annular frame, and the protrusion columns are arranged surrounding the blades.

In the fan impeller of the present invention, the protrusion columns are arranged in multiple layers and surround the blades.

In the fan impeller of the present invention, the outer annular frame has an annular plate body, and the protrusion columns are erected on at least one side of the annular plate body. The protrusion columns are erected on two sides of the annular plate body separately. At least a part of the protrusion columns is arranged along a radial outer edge of the annular plate body. One end of each blade is connected to an inner edge of the annular plate body. Each of the blades further extends to a surface of the annular plate body.

In the fan impeller of the present invention, each of the blades is spaced apart from an adjacent blade to form an outlet channel, and the outlet channel is disposed toward at least one of the protrusion columns. A part of the protrusion columns is arranged on an extension line of each blade.

In the fan impeller of the present invention, the blades include a plurality of long blades and a plurality of short blades staggered in order along a circumference of the inner frame. Two ends of each long blade are connected to the inner frame and the outer annular frame separately, and one end of each short blade is connected to the outer annular frame. Each of the long blades encloses an adjacent long blade to form an inlet channel in an axial direction of the inner frame.

In the fan impeller of the present invention, each of the protrusion columns is a cone column. At least a part of the protrusion columns is not equal in length.

In the fan impeller of the present invention, the inner frame and the outer annular frame constitute a blade plate; and the blades and the protrusion columns are arranged on a surface of the blade plate facing an air inlet.

The present invention further provides a fan including a frame body and a fan impeller as described above. The frame body has an air inlet and an air outlet. The fan impeller is accommodated and pivoted in the frame body. At least a part of the blades is exposed to the air inlet, and the disturbing structure is not exposed to the air inlet.

In the fan and fan impeller of the present invention, the outer circumference of the blade is provided with protrusion columns for disturbing the airflow. Thus, vortexes in the flow field can be generated to suppress the turbulence as to reduce noise, and the wind pressure can be increased to obtain better operating characteristics. Therefore, the fan impeller of the present invention can meet the requirements of heat dissipation and noise reduction of system.

BRIEF DESCRIPTION OF DRAWINGS

The features of the invention believed to be novel are set forth with particularity in the appended claims. The invention itself, however, may be best understood by reference to the following detailed description of the invention, which describes a number of exemplary embodiments of the invention, taken in conjunction with the accompanying drawings, in which:

DETAILED DESCRIPTION OF THE PREFERRED EMBODIMENTS

In cooperation with attached drawings, the technical contents and detailed description of the invention are described thereinafter according to a number of preferable embodiments, not being used to limit its executing scope. Any equivalent variation or modification made according to appended claims is all covered by the claims claimed by the present invention.

Figure 1:
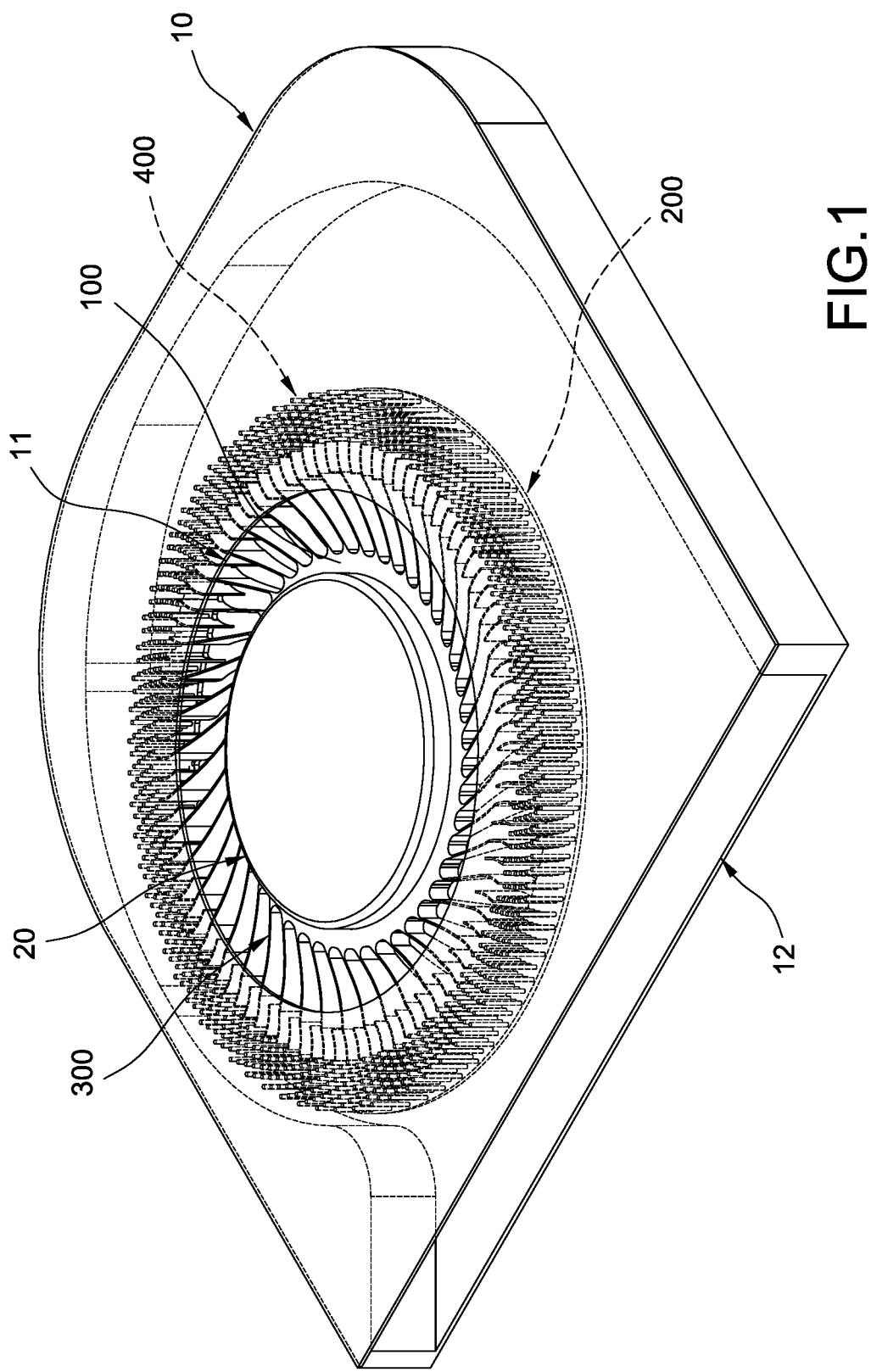
FIG. 1 is a perspective schematic view of the fan and fan impeller thereof of the first embodiment of the present invention.
Figure 2:
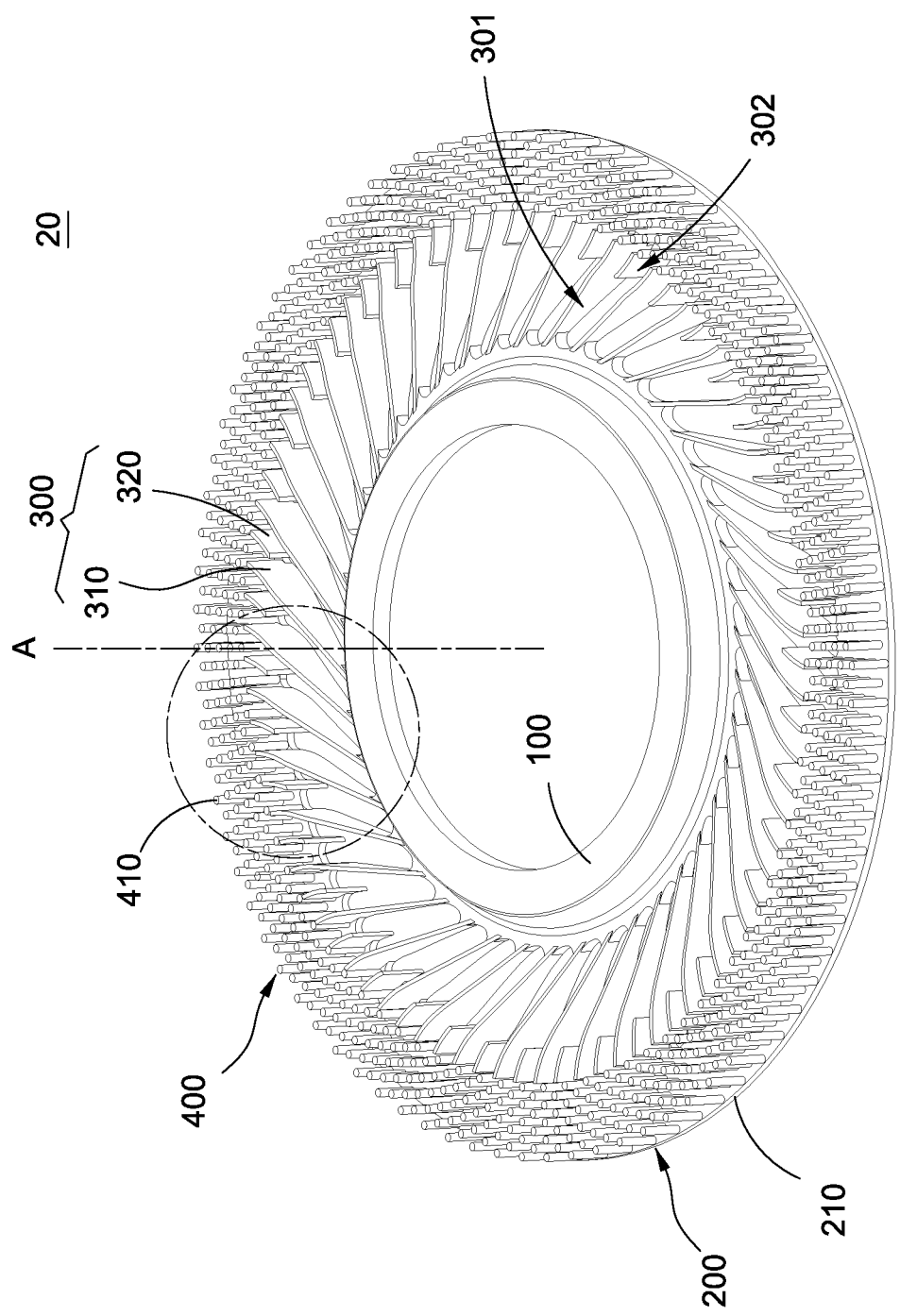
FIG. 2 is a perspective schematic view of the fan impeller of the first embodiment of the present invention.
Figure 3:
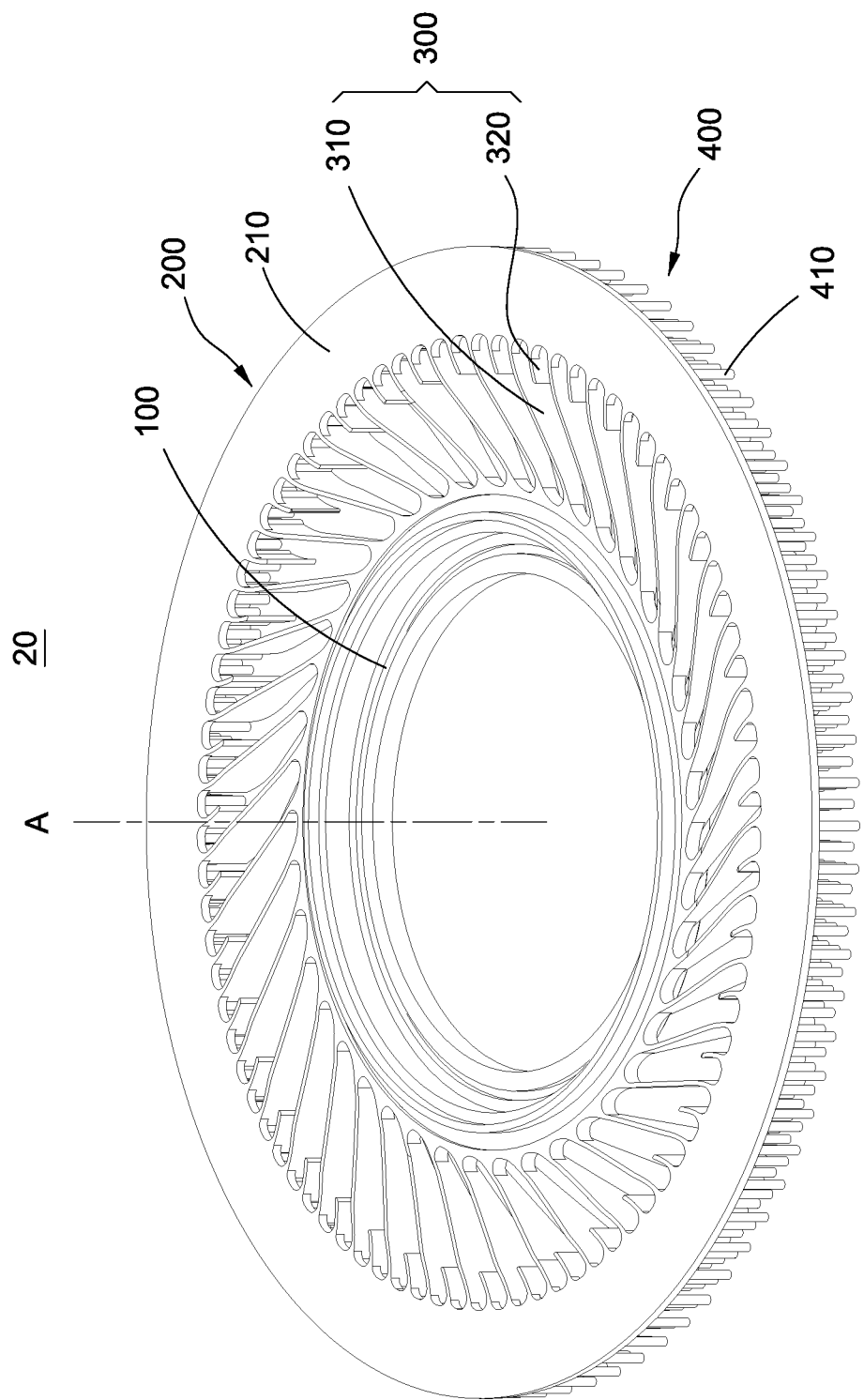
FIG. 3 another perspective schematic view of the fan impeller of the first embodiment of the present invention.

Please refer to FIG. 1 to FIG. 3. The first embodiment of the present invention provides a fan. The fan includes a frame body 10 and a fan impeller 20 accommodated and pivoted in the frame body 10, and the frame body 10 is configured in a shape of flat shoulder. One side of the frame body 10 is provided with an air inlet 11, and an air outlet 12 is provided at one side edge of the frame body 10. The fan impeller 20 includes an inner frame 100, an outer annular frame 200, a plurality of blades 30 and a disturbing structure 400.

In the present embodiment, the inner frame 100 is preferably a torus. A rotor and a rotating shaft can be disposed in the inner frame 100 and are capable of rotating along a rotation axis A.

The outer annular frame 20 is disposed around the inner frame 100. In the present embodiment, the outer annular frame 200 has an annular plate body 210. The annular plate body 210 and the inner frame 100 are preferably arranged concentrically.

Figure 4:
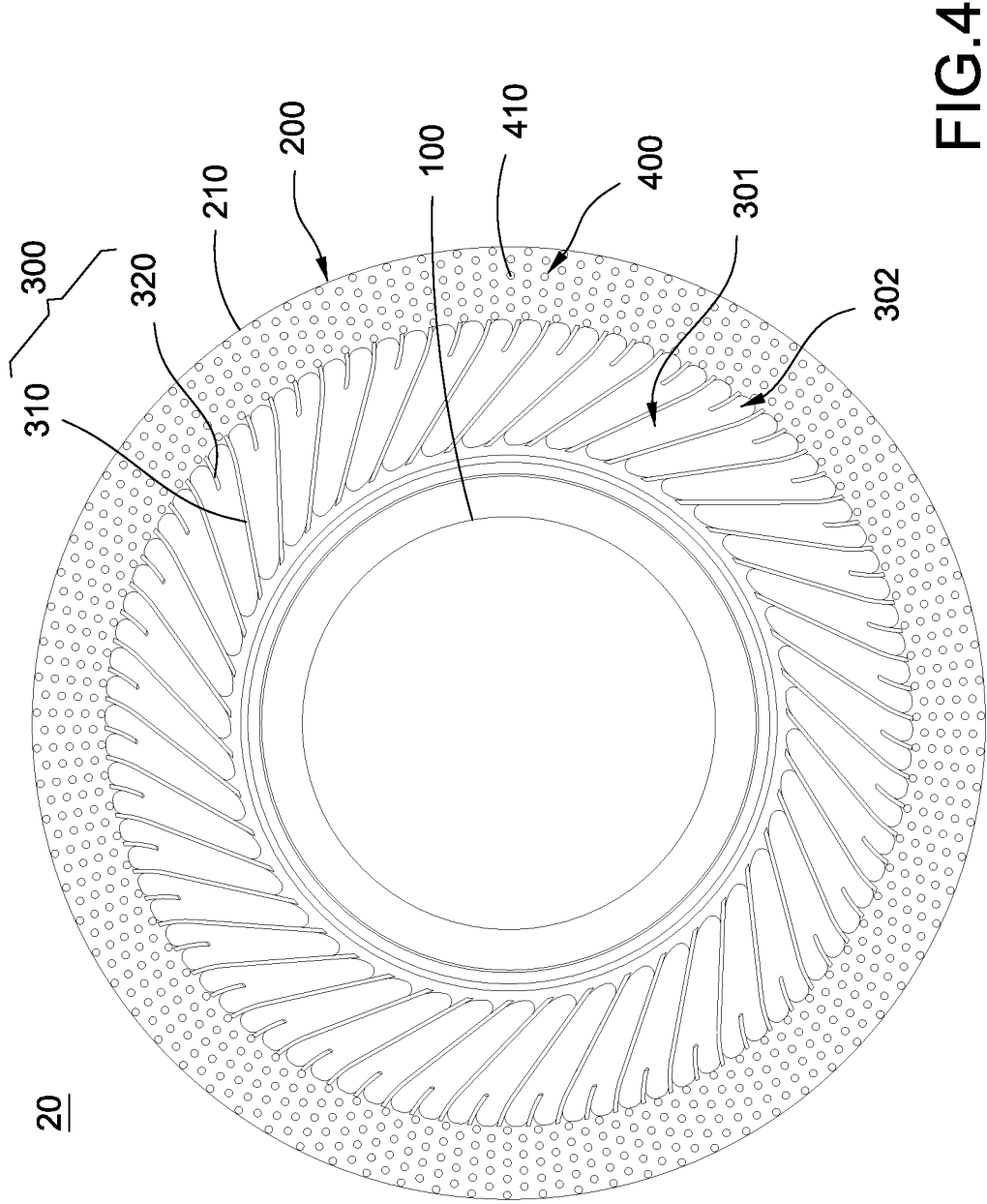
FIG. 4 is a top view of the fan impeller of the first embodiment of the present invention.

With referring to FIG. 3 and FIG. 4, the blades 300 are disposed between the inner frame 100 and the outer annular frame 200 and are arranged radially. Preferably, the inner frame 100, the outer annular frame 200 and the blade 300 are integrally formed as one piece, but the invention is not limited thereto. Specifically, one end of each blade 300 is connected to an inner edge of the annular plate body 210, and one side of each blade 300 is connected to the annular plate body 210. Each of the blades 300 can optionally extend to a surface of the annular plate body 210 (for example, the surface facing the air inlet 11), but the invention is not limited thereto.

In the present embodiment, the blades 300 have a plurality of long blades 310 and a plurality of short blades 320 staggered in order along a circumference of the inner frame 100. Two ends of each long blade 310 are connected to the inner frame 100 and the outer annular frame 200 separately, and one end of each short blade 320 is connected to the outer annular frame 200. In addition to driving the airflow, each long blade 310 is connected between the inner frame 100 and the outer annular frame 200 as fan impeller structures. However, each short blade 320 is only used to drive the airflow without connecting to the inner frame 100. Specifically, each of the long blades 310 encloses an adjacent long blade 310 to form an air inlet channel 301 in an axial direction of the inner frame 100; each long blade 310 and an adjacent short blade 320 are arranged in staggered to form an outlet channel 302. With long blades 310 and short blades 320 arranged alternately, the spacing between adjacent long blades 310 can be increased without reducing the airflow capacity of the blades 300 (that is, the quantity of blades 300 is not reduced). Thus, a larger inlet channel 301 can be formed to increase the air intake, and the resistance of flow field in the inlet channel 301 can be reduced.

Figure 5:
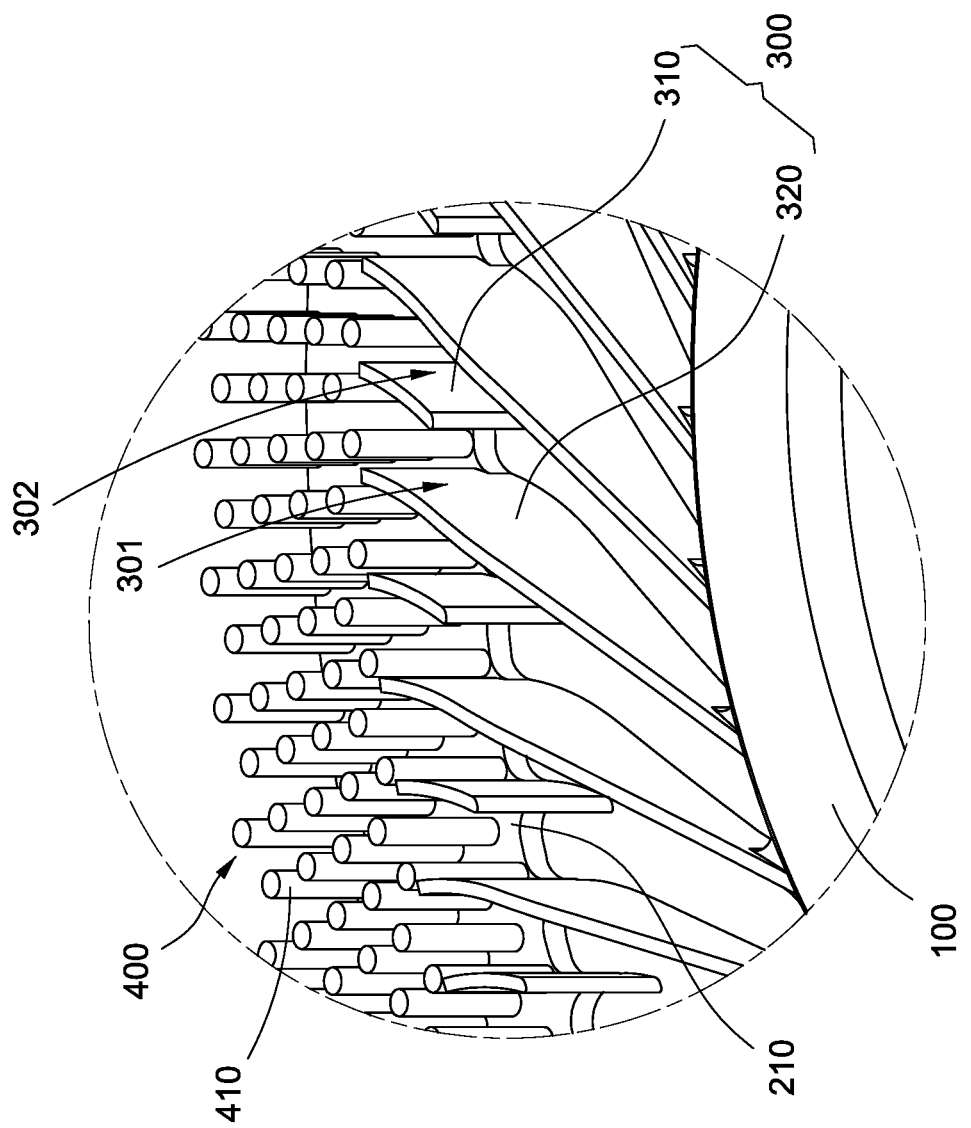
FIG. 5 is a partial enlarged view of the fan impeller of the first embodiment of the present invention.

Please refer to FIG. 4 and FIG. 5. The disturbing structure 400 has a plurality of protrusion columns 410 disposed on the outer annular frame 200. In the present embodiment, the protrusion columns 410 are cylinders with equal-length, which can reduce the resistance of flow field of airflow passing through the protrusion columns 410, but the present invention is not limited thereto. The protrusion column 410 can also be a column of other cross-sectional shapes, such as a column with an elliptical or a drop-shaped cross section. Moreover, each of the protrusion columns 410 can be a cone column, and the length of the protrusion columns may not be equal. In the present embodiment, the protrusion columns 410 are erected on one side of the annular plate body 210 (in the present embodiment, the side facing the air inlet 11). The protrusion columns 410 are arranged surrounding the blades 300, and each outlet channel 302 is disposed toward at least one of the protrusion columns 410, so that the airflow leaving the blade 300 through the outlet channels 302 can pass through the protrusion columns 410. When the airflow passes through the protrusion columns 410, the protrusion column 410 can induce vortexes on leeward sides thereof; thus, achieving the effect of directing airflow to reduce the noise of the flow field. Furthermore, the protrusion columns 410 can also increase the pressure difference between the upstream and downstream of the flow field to improve the performance of the fan impeller. Preferably, the protrusion columns 410 are arranged in multiple layers and surround the blades 300 to increase the density of vortexes. In addition, at least a part of the protrusion columns 410 are arranged along a radial outer edge of the annular plate body 210, and a part of the protrusion columns 410 are arranged on an extension line of each blade 300; thus, the outflow from each outlet channel 302 can also pass through the protrusion columns 410, so that the airflow can induce vortexes by each protrusion column 410. Therefore, a better effect of directing airflow will be achieved, and the noise of flow field can be reduced at the same time.

Figure 6:
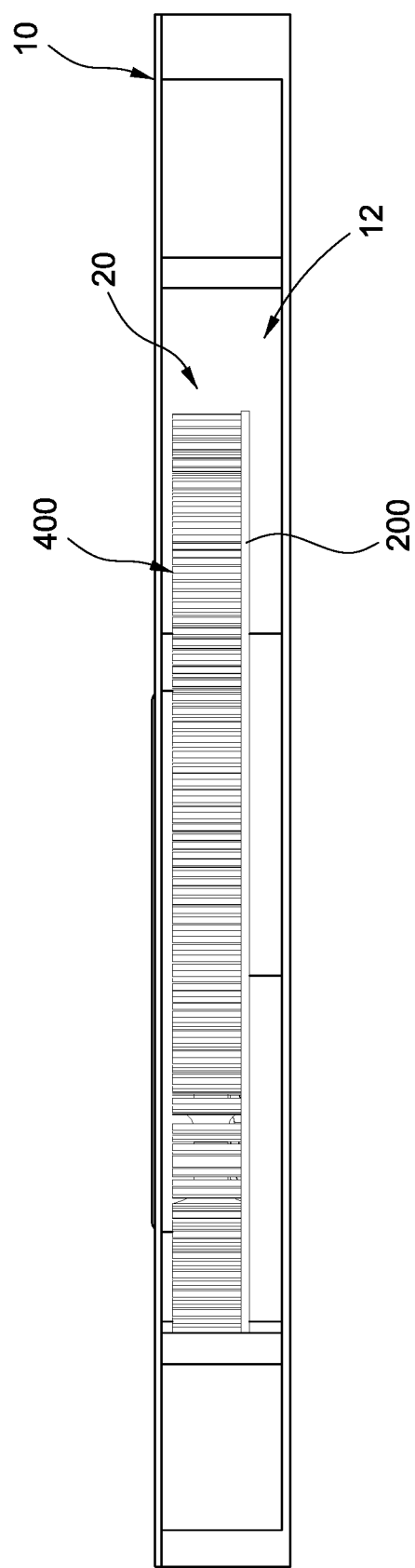
FIG. 6 is a side schematic view of the fan of the first embodiment of the present invention.
Figure 7:
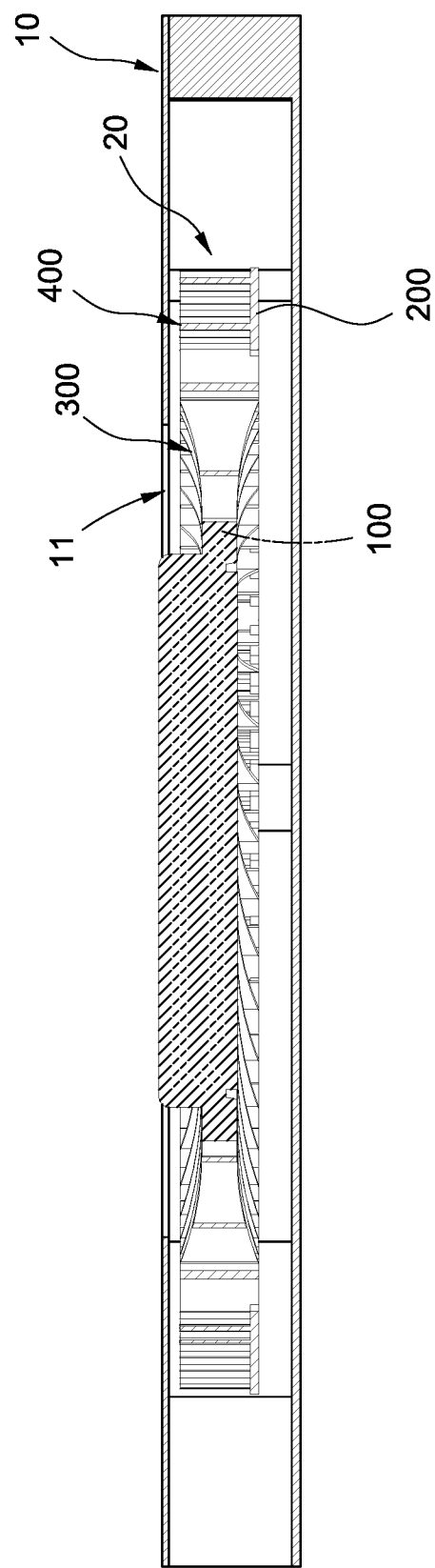
FIG. 7 is a cross sectional schematic view of the fan of the first embodiment of the present invention.

Please refer to FIG. 1. In the present embodiment, blade roots of the long blades 310 among the blades 300 of the fan impeller 20 of the fan are exposed to the air inlet 11. The short blades 320 are covered by the frame body 10 without exposing to the air inlet 11. Moreover, with referring to FIG. 6 and FIG. 7, when the fan impeller 20 rotates, at least a part of the disturbing structure 400 is exposed to the air outlet 12, and the disturbing structure 400 is shielded by the frame body without being exposed to the air inlet 11. Therefore, the disturbing structure 400 can be ensured to only interfere with the outflow without obstructing the inflow.

The inner frame 100 and the outer annular frame 200 of the fan impeller 20 of the present embodiment are integrated to form a single blade plate, so that each blade 300 and each protrusion column 410 of the disturbing structure 400 are both disposed on the surface of the blade plate facing the air inlet 11. The protrusion columns 410 can also induce vortexes; thereby achieving the effect of directing airflow to reduce the noise of the flow field. Please refer to FIG. 8 to FIG. 10. The second embodiment of the present invention provides a fan. The fan includes a frame body 10 and a fan impeller 20a accommodated and pivoted in the frame body 10. The frame body 10 is configured in a shape of flat shoulder. One side of the frame body 10 is provided with an air inlet 11, and an air outlet 12 is provided at one side edge of the frame body 10. The fan impeller 20a includes an inner frame 100, an outer annular frame 200, a plurality of blades 30 and a disturbing structure 400.

In the present embodiment, the inner frame 100 is preferably a cylindrical shell with one end closed. A rotor and a rotating shaft can be disposed in the inner frame 100 and are capable of rotating along a rotation axis A.

The outer annular frame 200 is disposed around the inner frame 100. In the present embodiment, the outer annular frame 200 has an annular plate body 210. The annular plate body 210 and the inner frame 100 are preferably arranged concentrically.

Figure 10:
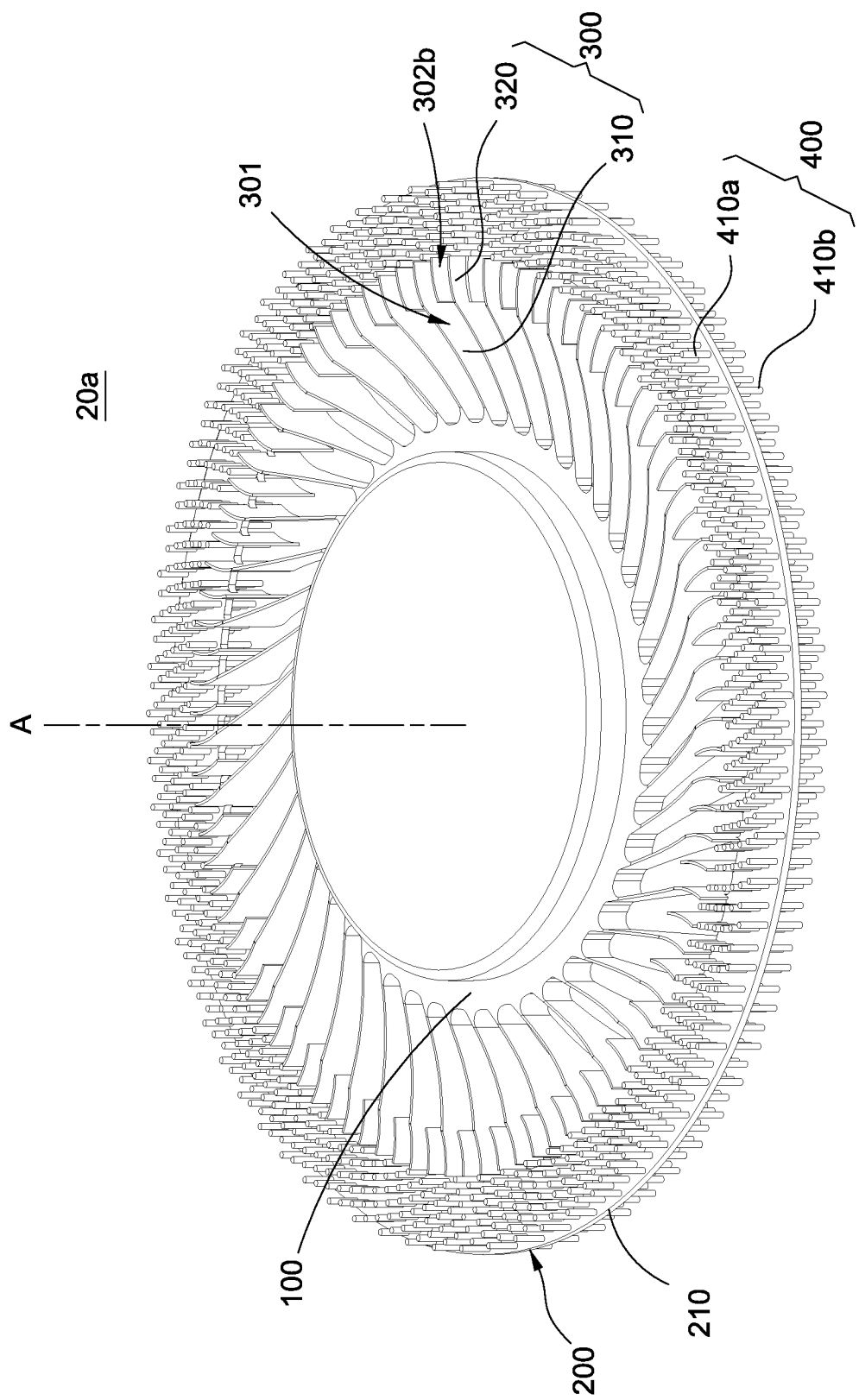
FIG. 10 another perspective schematic view of the fan impeller of the second embodiment of the present invention.
Figure 11:
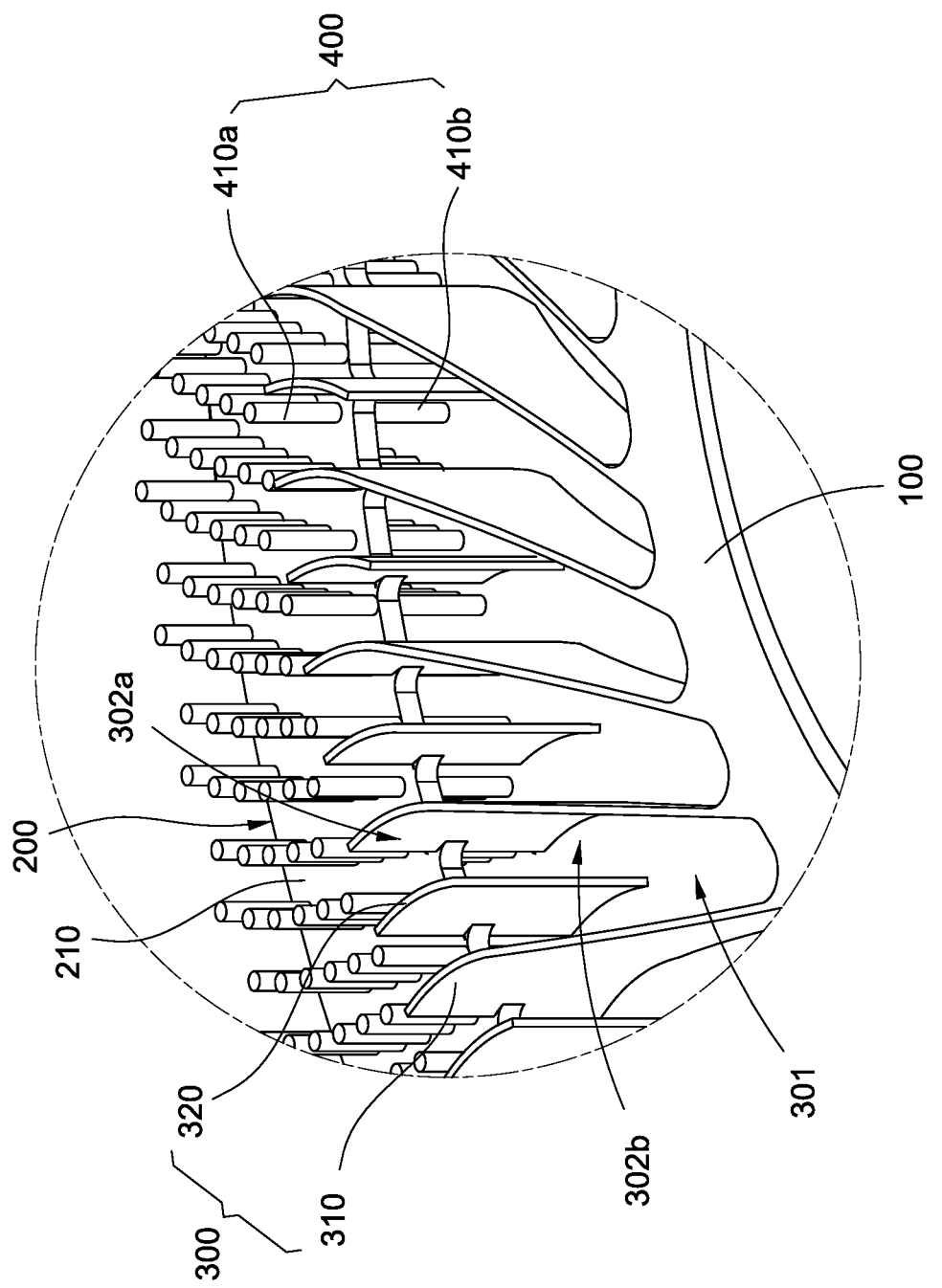
FIG. 11 is a partial enlarged view of the fan impeller of the second embodiment of the present invention.
Figure 12:
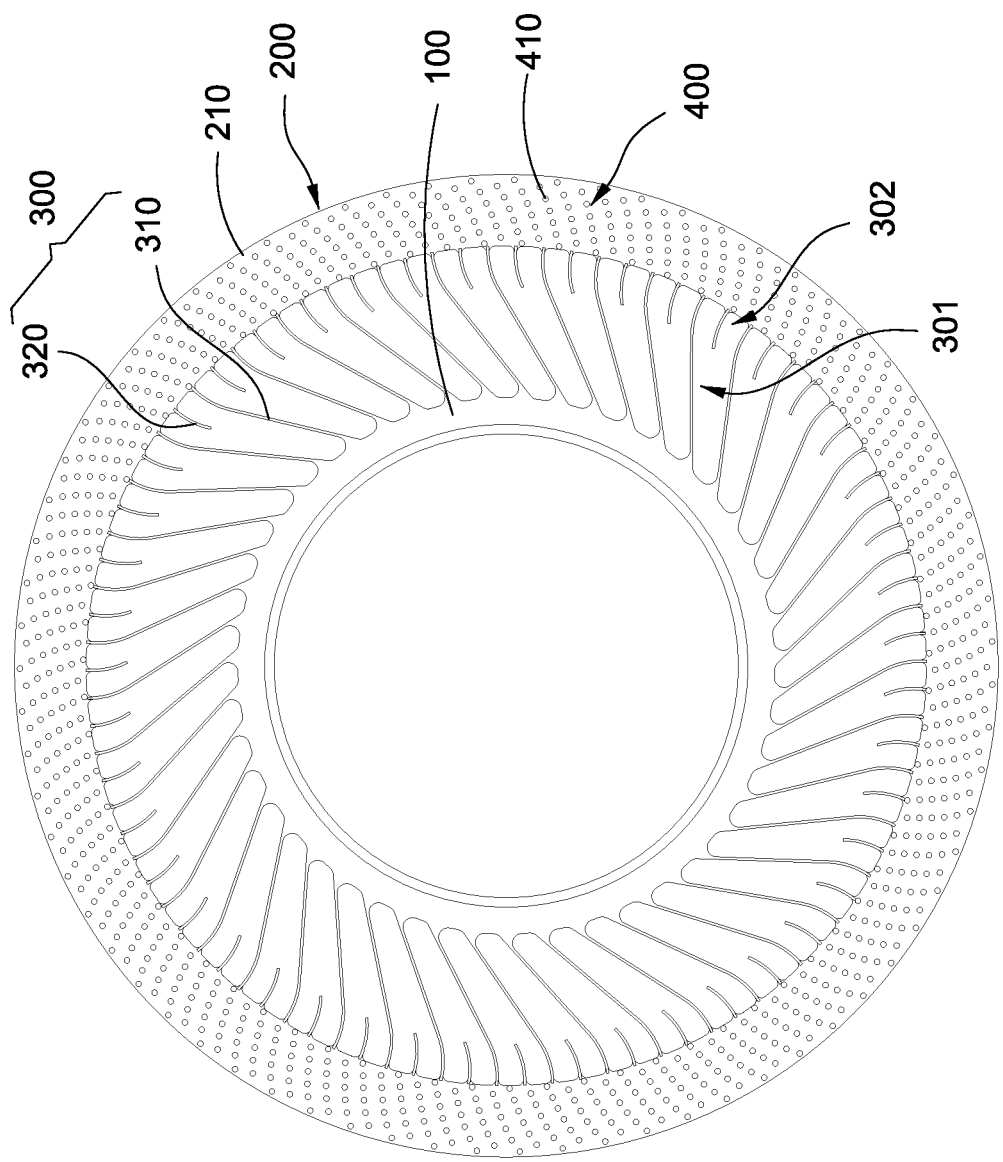
FIG. 12 is a top view of the fan impeller of the second embodiment of the present invention.

Please refer to FIG. 10 to FIG. 12. The blades 300 are disposed between the inner frame 100 and the outer annular frame 200 and are arranged radially. Preferably, the inner frame 100, the outer annular frame 200 and the blade 300 are integrally formed as one piece, but the invention is not limited thereto. Specifically, a center of one end of each blade 300 is connected to an inner edge of the annular plate body 210; therefore, airflow enter through both sides of the annular plate 210. In addition, each of the blades 300 can optionally extend to a surface of the annular plate body 210, but the invention is not limited thereto.

In the present embodiment, the blades 300 have a plurality of long blades 310 and a plurality of short blades 320 staggered in order along a circumference of the inner frame 100. Two ends of each long blade 310 are connected to the inner frame 100 and the outer annular frame 200 separately, and one end of each short blade 320 is connected to the outer annular frame 200. In addition to driving the airflow, each long blade 310 is connected between the inner frame 100 and the outer annular frame 200 as fan impeller structures. However, each short blade 320 is used to drive the airflow without connecting to the inner frame 100. Specifically, each long blade 310 encloses an adjacent long blade 310 to form an air inlet channel 301 in an axial direction of the inner frame 100. Each blade 300 is spaced apart from an adjacent blade 300 to form an outlet channel 302a, 302b on both sides of the annular plate body 210 separately. With long blades 310 and short blades 320 arranged alternately, the spacing between adjacent long blades 310 can be increased without reducing the airflow capacity of the blades 300 (that is, the quantity of blades 300 is not reduced). Thus, a larger inlet channel 301 can be formed to increase the air intake, and the resistance of flow field in the inlet channel 301 can be reduced.

The disturbing structure 400 is preferably comb-shaped. Specifically, the disturbing structure 400 has a plurality of protrusion columns 410a, 410b disposed on the outer annular frame 200. In the present embodiment, the protrusion columns 410a, 410b are cylinders with equal-length, but the present invention is not limited thereto. The protrusion column 410 can also be a column of other cross-sectional shapes, such as a column with an elliptical or a drop-shaped cross section which can reduce the resistance of flow field of airflow passing through the protrusion columns 410a, 410b. Moreover, each of the protrusion columns 410a, 410b can be a cone column, and the length of the protrusion columns 410a may not be equal. In the present embodiment, the protrusion columns 410a, 410b are erected on two sides of the annular plate body 210. The protrusion columns 410a, 410b are arranged surrounding the blades 300, and each outlet channel 302a, 302b is disposed toward at least one of the protrusion columns 410a, 410b, so that the airflow leaving the blade 300 through the outlet channels 302a, 302b can pass through the protrusion columns 410a, 410b. When the airflow pass through the protrusion columns 410a, 410b, the protrusion column 410a, 410b can induce vortexes on leeward sides thereof; thereby achieving the effect of directing airflow to reduce noise of the flow field. Furthermore, the protrusion columns 410a, 410b can also increase the pressure difference between the upstream and downstream of the flow field to improve the performance of the fan impeller. Preferably, the protrusion columns 410a, 410b are arranged in multiple layers and surround the blades 300 to increase the density of the vortexes. In addition, at least a part of the protrusion columns 410a, 410b are arranged along a radial outer edge of the annular plate body 210, and a part of the protrusion columns 410a, 410b are arranged on an extension line of each blade 300. Therefore, the outflow from each outlet channel 302a, 302b can also pass through the protrusion columns 410a, 410b.

Figure 8:
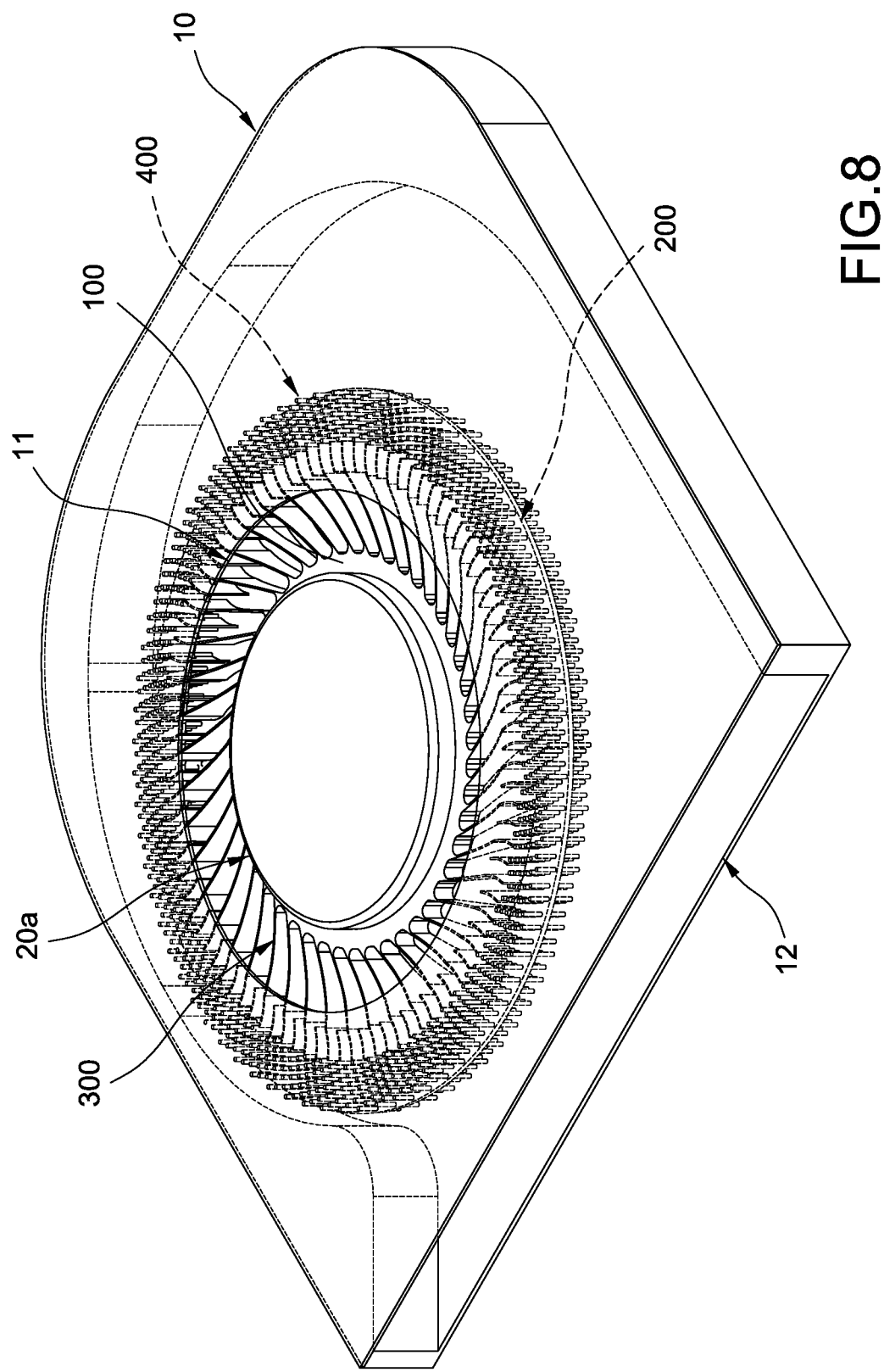
FIG. 8 is a perspective schematic view of the fan and fan impeller thereof of the second embodiment of the present invention.
Figure 9:
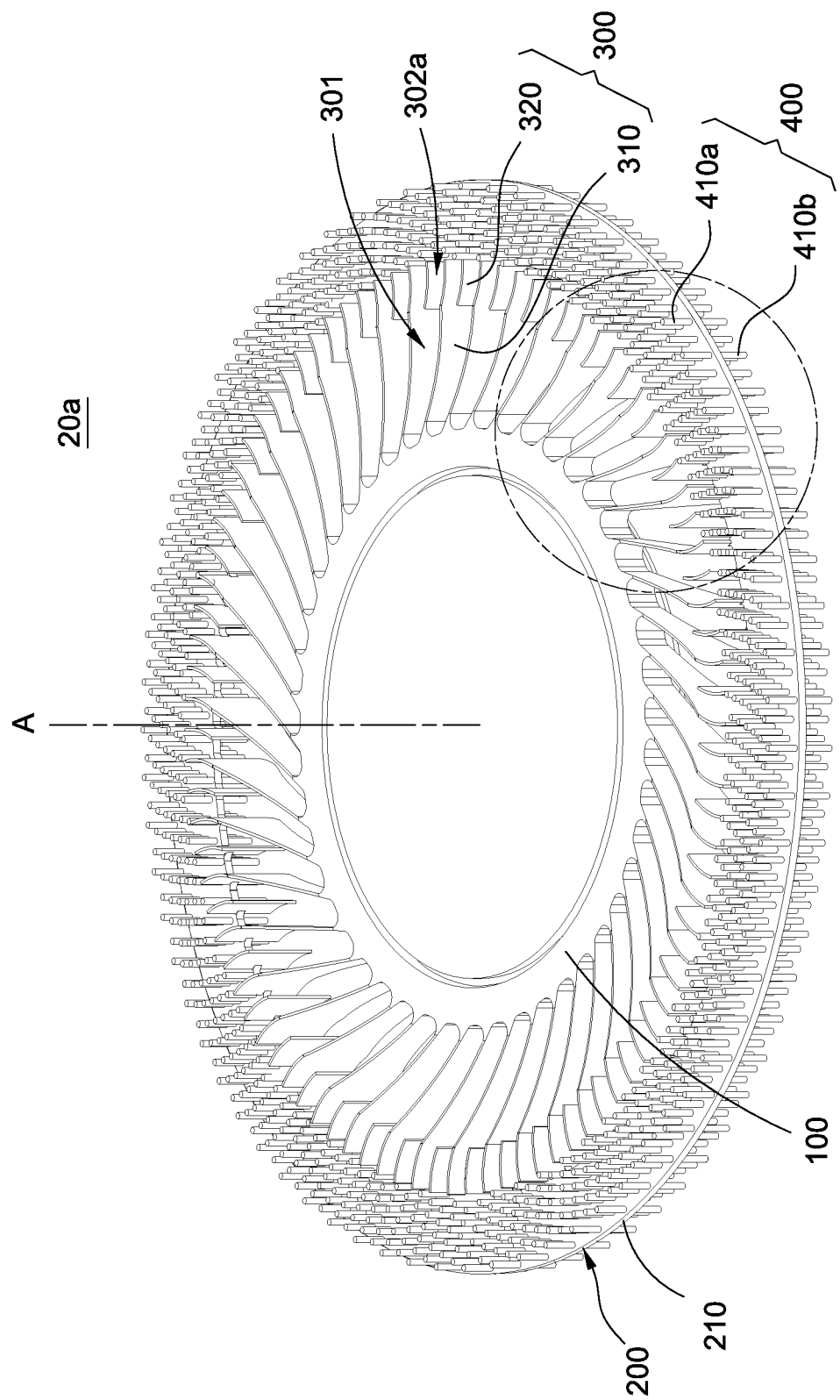
FIG. 9 is a perspective schematic view of the fan impeller of the second embodiment of the present invention.
Figure 13:
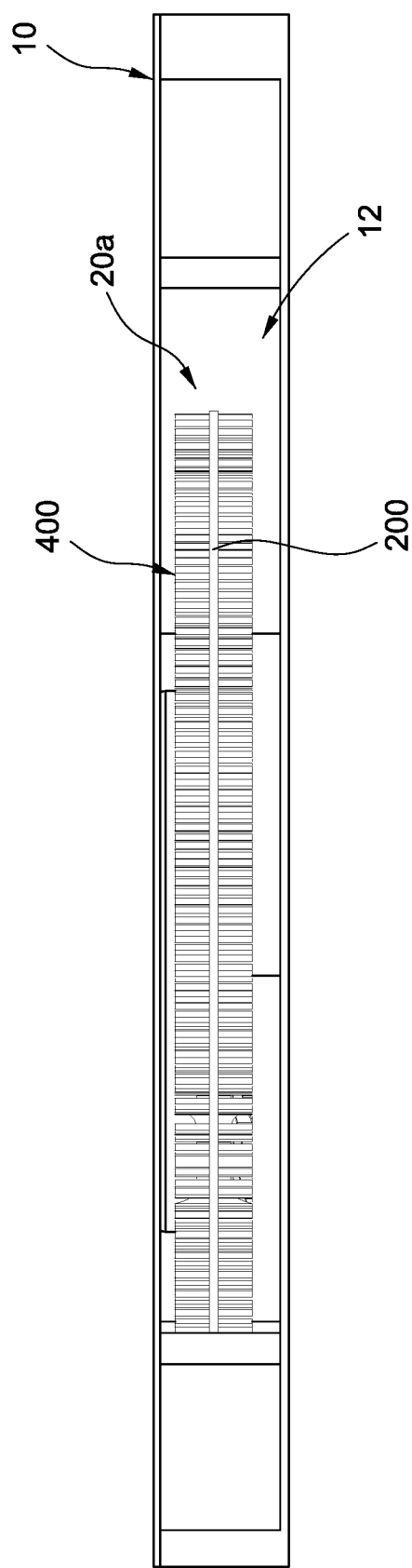
FIG. 13 is a side schematic view of the fan of the second embodiment of the present invention.
Figure 14:
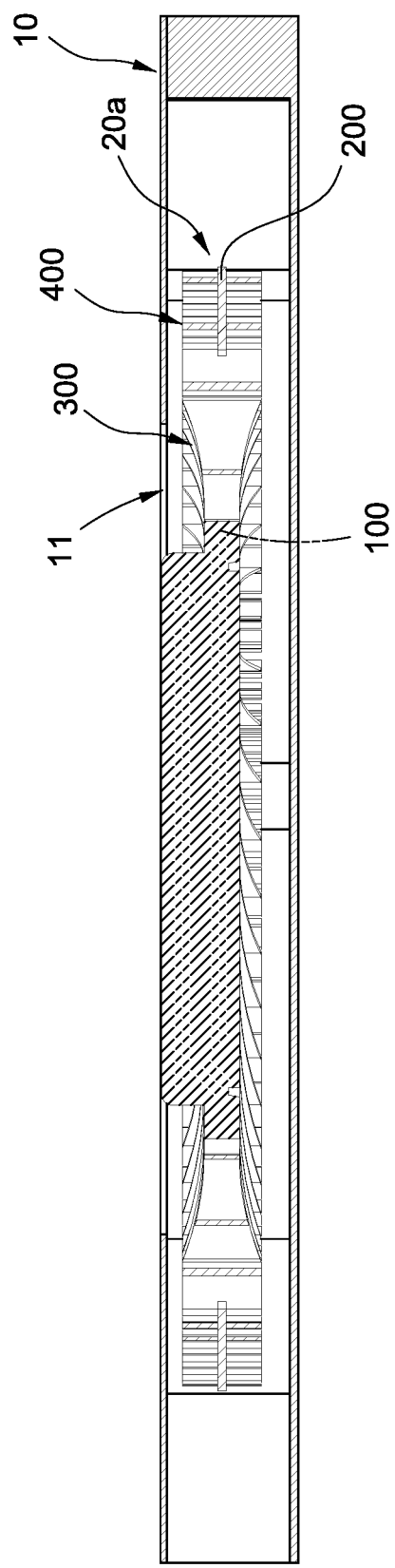
FIG. 14 is a cross sectional schematic view of the fan of the second embodiment of the present invention.

Please refer to FIG. 8. In the present embodiment, blade roots of the long blades 310 among blades 300 of the fan impeller 20a of the fan are exposed to the air inlet 11. The short blades 320 are covered by the frame body 10 without being exposed to the air inlet 11. Moreover, with referring to FIG. 13 and FIG. 14, when the fan impeller 20a rotates, at least a part of the disturbing structure 400 is exposed to the air outlet 12, and the disturbing structure 400 is shielded by the frame body without exposing to the air inlet 11. Therefore, the disturbing structure 400 can be ensured to only interfere with the outflow without obstructing the inflow.

In the present invention, the outer circumference of the blades 300 of the fan impeller are provided with protrusion columns 410, 410a, 410b for disturbing the airflow. Thus, vortexes in the flow field can be generated to suppress the turbulence as to reduce noise, and the wind pressure can be increased to obtain better operating characteristics. Therefore, the fan impeller of the present invention can meet the requirements of heat dissipation and noise reduction of the system.

Furthermore, the height of protrusion columns 410, 410a, 410b of the fan impeller of the present invention can be directly adjusted on the molds to balance the fan impeller. The blade 300 can be produced by plastic injection, die casting, metal stamping or injection molding etc.

Although the present invention has been described with reference to the preferred embodiment thereof, it will be understood that the invention is not limited to the details thereof. Various substitutions and improvements have been suggested in the foregoing description, and others will occur to those of ordinary skill in the art. Therefore, all such substitutions and improvements are intended to be embraced within the scope of the invention as defined in the appended claims.

What is claimed is:
1. A fan impeller, comprising:
  an inner frame rotating along a rotation axis;
  an outer frame disposed around the inner frame;
  a plurality of blades disposed between the inner frame and the outer frame and arranged radially; and
  a disturbing structure having a plurality of protrusion columns disposed on the outer frame, and the protrusion columns being arranged surrounding the blades,
  wherein the protrusion columns are arranged in multiple layers and surround the blades.

2. The fan impeller according to claim 1, wherein at least a part of the protrusion columns is not equal to another part of the protrusion columns in length.

3. The fan according to claim 1, further comprising:
a frame body having an air inlet and an air outlet,
wherein, at least a part of the blades is exposed to the air inlet, and the disturbing structure is not exposed to the air inlet.

4. A fan impeller, comprising:
an inner frame rotating along a rotation axis;
an outer frame disposed around the inner frame;
a plurality of blades disposed between the inner frame and the outer frame and arranged radially; and
a disturbing structure having a plurality of protrusion columns disposed on the outer frame, and the protrusion columns being arranged surrounding the blades,
wherein the outer frame has an annular plate body, and the protrusion columns are erected on at least one side of the annular plate body,
wherein the protrusion columns are erected on two sides of the annular plate body separately.

5. The fan impeller according to claim 4, wherein at least a part of the protrusion columns is arranged along a radial outer edge of the annular plate body.

6. The fan impeller according to claim 4, wherein one end of each blade is connected to an inner edge of the annular plate body.

7. The fan impeller according to claim 4, wherein each of the blades further extends to a surface of the annular plate body.

8. The fan according to claim 4, wherein at least a part of the protrusion columns is not equal to another part of the protrusion columns in length.

9. The fan according to claim 4, further comprising:
a frame body having an air inlet and an air outlet;
wherein, at least a part of the blades is exposed to the air inlet, and the disturbing structure is not exposed to the air inlet.

10. A fan impeller, comprising:
an inner frame rotating along a rotation axis;
an outer frame disposed around the inner frame;
a plurality of blades disposed between the inner frame and the outer frame and arranged radially; and
a disturbing structure having a plurality of protrusion columns disposed on the outer frame, and the protrusion columns being arranged surrounding the blades,
wherein each of the blades is spaced apart from an adjacent blade to form an outlet channel, and the outlet channel is disposed toward at least one of the protrusion columns,
wherein a part of the protrusion columns is arranged on an extension line of each blade.

11. The fan according to claim 10, at least a part of the protrusion columns is not equal to another part of the protrusion columns in length.

12. The fan according to claim 10, further comprising:
a frame body having an air inlet and an air outlet;
wherein, at least a part of the blades is exposed to the air inlet, and the disturbing structure is not exposed to the air inlet.

* * * * *